Feb. 18, 1936.  J. SNEED  2,031,390
BRAKE
Filed Dec. 30, 1929   3 Sheets-Sheet 1
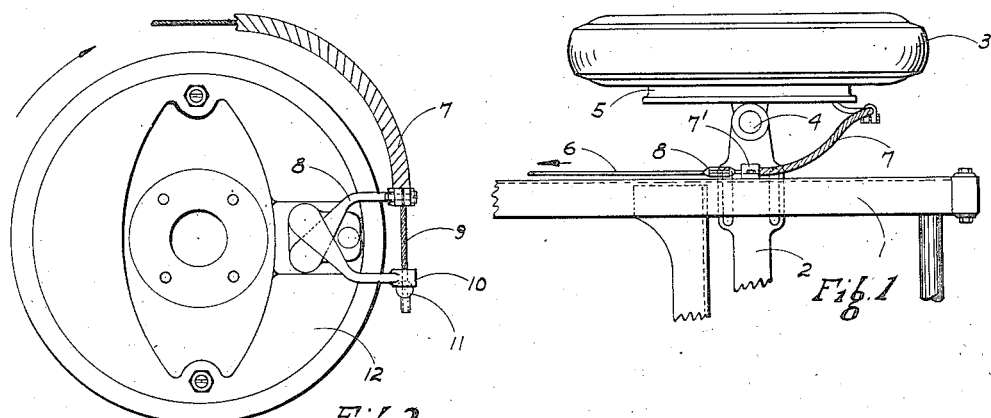
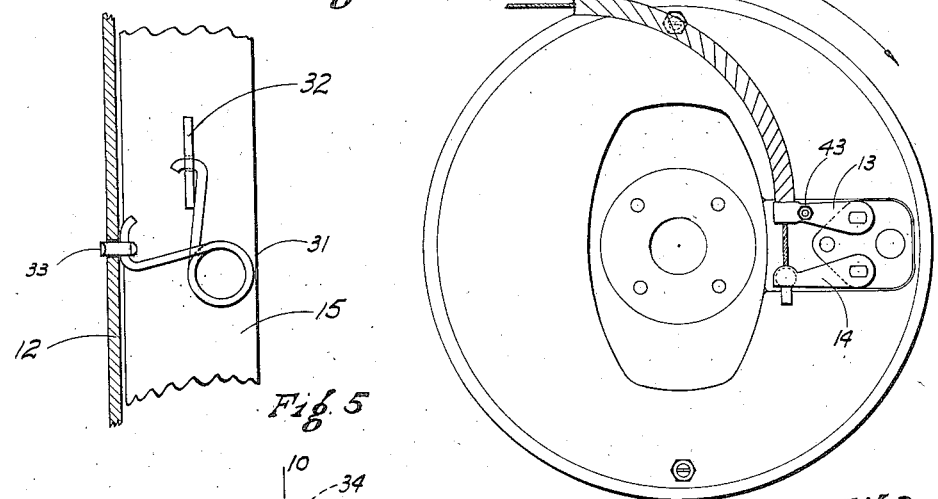
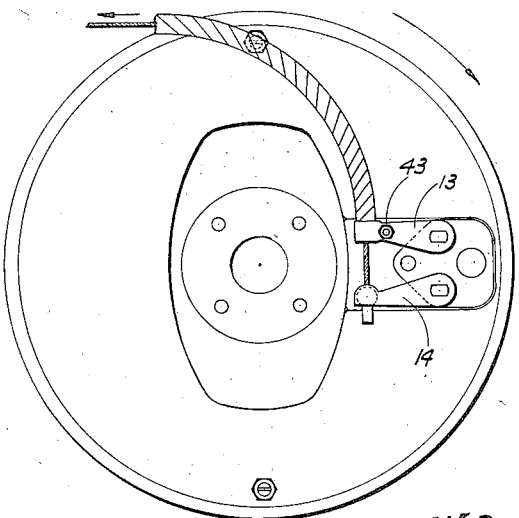
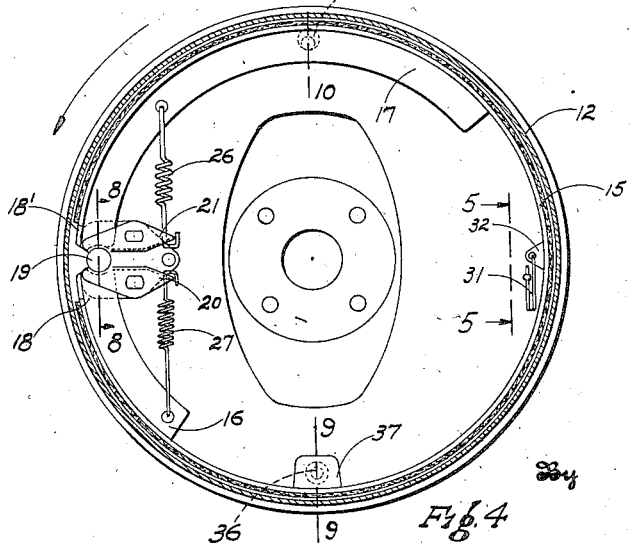
Inventor
JOHN SNEED.
Attorney

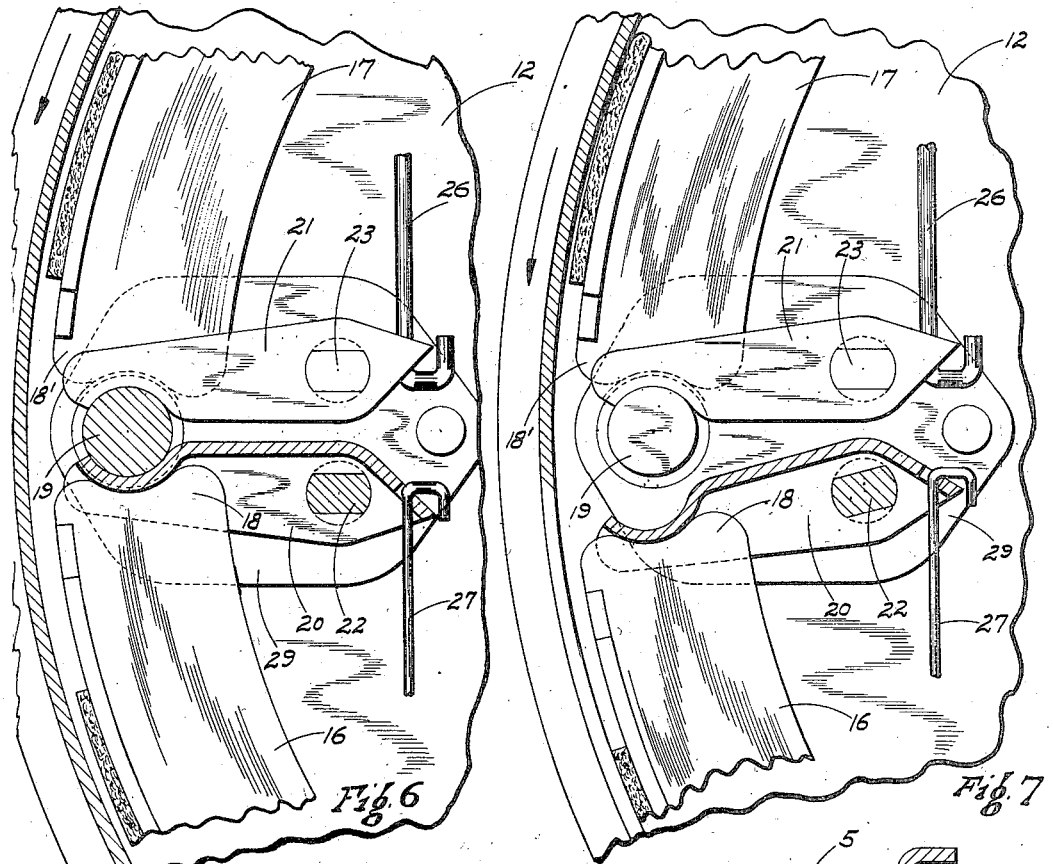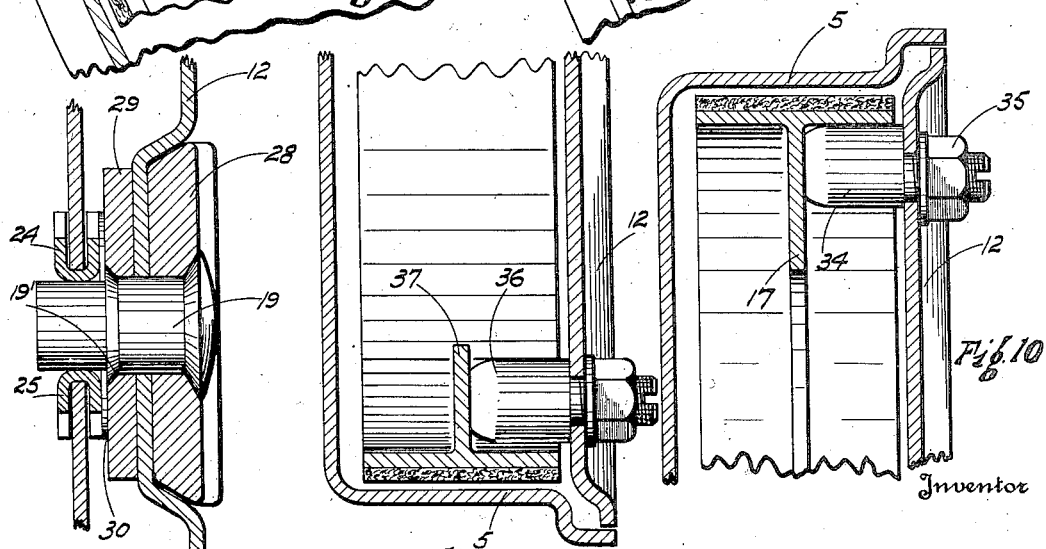

Feb. 18, 1936. J. SNEED 2,031,390
BRAKE
Filed Dec. 30, 1929 3 Sheets-Sheet 3
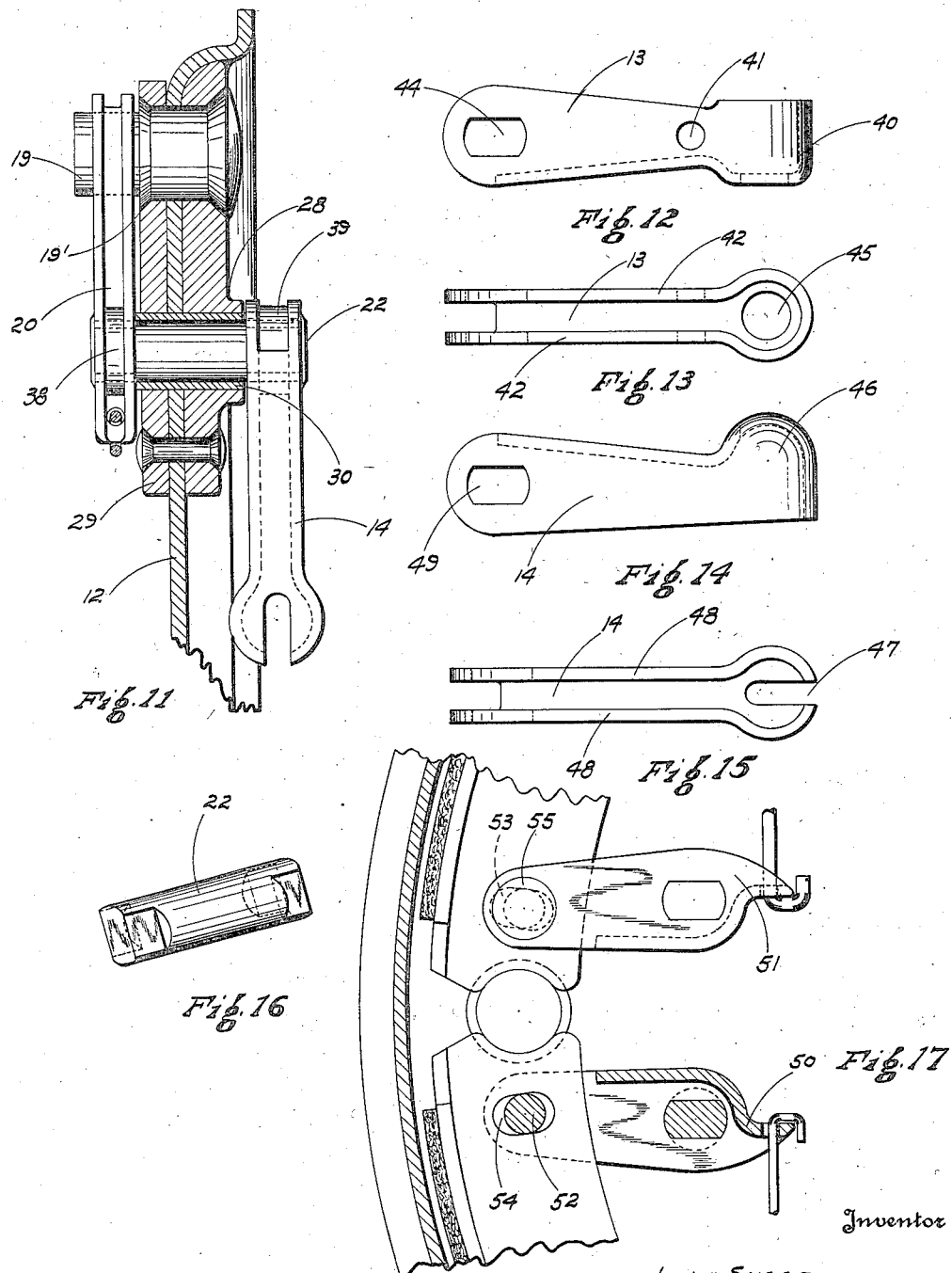

Patented Feb. 18, 1936

2,031,390

UNITED STATES PATENT OFFICE 2,031,390

BRAKE

John Sneed, Grosse Pointe Shores, Mich., assignor to The Midland Steel Products Company, Cleveland, Ohio, a corporation of Ohio, trustee for Steeldraulic Brake Corporation, Detroit, Mich., a corporation of Michigan Application December 30, 1929, Serial No. 417,301

12 Claims. (Cl. 188—78)

This invention relates to brakes and more particularly to vehicle brakes of the type adapted to automobiles.

It is among the objects of my invention to provide a vehicle brake in which the actuating force is applied to both ends of a floating brake shoe with the resulting movement of one end into braking contact with the brake drum; to provide a vehicle brake having a floating open ended shoe and actuating connections whereby one end of the shoe is moved in the direction of rotation of the wheel and the other end anchored when the brake is applied; to provide a brake which may easily be adjusted to compensate for wear; to provide a brake having a small number of simple parts; to provide a mounting for the brake shoe which centers it in idle position, prevents rattling and eliminates drag against the apron; and to provide a brake which is adapted to economical manufacture and assembly.

Other objects of my invention will appear from the following description of a preferred form of my invention, reference being had to the accompanying drawings.

In the drawings, Fig. 1 is a fragmentary plan view showing the left front wheel of a vehicle equipped with my brake; Fig. 2 is an elevation looking at the apron of the brake drum shown in Fig. 1; Fig. 3 is a view similar to Fig. 2 illustrating a modified form of external lever construction; Fig. 4 is an elevation of my brake looking from the wheel side with the drum in section; Fig. 5 is an enlarged fragmentary section taken on the line 5—5 of Fig. 4; Fig. 6 is an enlarged view partly in section illustrating the brake shoe operating levers shown in Fig. 4; Fig. 7 is a view similar to Fig. 6 except that the lower end of the brake shoe is shown in position; Fig. 8 is an enlarged section taken on the line 8—8 of Fig. 4; Fig. 9 is an enlarged section taken on the line 9—9 of Fig. 4; Fig. 10 is an enlarged section taken on line 10—10 of Fig. 4; Figure 11 is a detail partly in section showing a set of brake operating levers including both the external and internal members; Figs. 12 and 13 are views of the conduit actuated external lever shown in Fig. 3; Figs. 14 and 15 are similar views of the cable actuated external lever shown in Fig. 3; Fig. 16 is a detached perspective view of one of the brake actuating lever shafts; Fig. 17 illustrates a modified form of internal lever and shoe end construction.

Referring to Fig. 1, the vehicle frame 1 and front axle 2 are conventionally shown and may be of any desirable type. The wheel 3 is swivelly mounted on the steering knuckle 4 which also carries the brake apron and shoe and its associated operating mechanism, as will be more fully described later. The brake drum 5 is secured to the wheel and rotates therewith. The braking force may be applied through the brake rod 6 which is secured at its end to a flexible cable housed in the flexible conduit 7. This conduit 7 is secured at one end to the frame 1 and at its opposite end to the brake actuating mechanism. A turnbuckle 8 or other suitable means for varying the length of the brake rod may be provided to facilitate adjustment of the brake.

As is best seen in Fig. 2, the flexible conduit 7, which may be similar to either of those described and claimed in my copending application, Ser. No. 51,094 filed August 19, 1925, or Ser. No. 286,153 filed June 18, 1928, is secured at its lower end to the external lever 8 and the cable 9 extends beyond the end of the conduit 7, passes through an aperture in the end of the external lever 10 and is provided with a suitable enlarged portion such as ball 11 to prevent it from going through the aperture in the lever 10 when the braking force is applied.

It will be noted that in the structure shown in Fig. 2 the external levers 8 and 10 project out beyond the edge of the apron 12. This construction is advantageous where brake drums of comparatively small diameter are used. In Fig. 3 I have illustrated another arrangement of the external operating levers which is particularly adapted to brakes of comparatively large diameter. In this latter construction the levers 13 and 14 extend inwardly from their pivot points, the top lever 13 being secured to the end of the conduit and the lower lever 14 having a cup shaped portion adapted to take a cable retaining ball similar to the ball 11, shown in Fig. 2.

As stated above, my invention is particularly adapted to brakes of the self-energizing type and in the drawings I have illustrated a brake having a single floating shoe 15 reinforced by inwardly extending webs 16 and 17. The shoe 15 has spaced ends 18 and 18' which lie on either side of the anchor pin 19. A pair of shoe operating levers 20 and 21 are secured to the rotatable shafts 22 and 23. These shafts extend through the apron 12 and carry on their outer ends the external levers 13 and 14 or 8 and 10 depending on which type of external levers are used. The shoe actuating levers 20 and 21 are preferably stamped out of sheet metal and have U-shaped end portions 24 and 25 (best shown in Figs. 6 and 8) which engage the ends of the flanges 16 and 17 of the shoe 15. A retractor spring 26 is connected to the inner end of the lever 21 and to the flange 17. A retractor spring 27, similar to spring 26 but of lighter weight connects the lower end of the lever 20 to the flange 16.

The anchor pin 19 extends through the outer plate 28, the apron 12 and the inner plate 29 and is preferably upset as shown at 19' into a countersunk aperture in the plate 29, thus acting as a rivet and holding the plates 28 and 29 firmly in place on the apron 12. The inner plate 29 serves primarily to support and reinforce the pin 19. It permits a minimum distance to be maintained between the points of contact of the ends 24 and 25 of the levers 20 and 21 on the pin 19 and the supported portion of pin 19. A further object of plate 29 is to provide additional bearing support for lever shafts 22 and 23.

The lever shafts 22 and 23 pass through and are rotatable in bushings 30 (Fig. 11) which are pressed into suitable holes through the plates 28 and 29 and the apron 12. The ends of the shafts 22 and 23 are preferably flattened, as best shown in Fig. 16. The levers 13 and 14 and 20 and 21 are provided with suitably shaped holes to fit the ends of the shafts 22 and 23, which ends may be riveted over after the levers are assembled to firmly hold them in position on the shafts.

A spring 31 is attached at one end to a tab 32 which extends inwardly from the shoe 15 at a point substantially opposite its spaced ends. The other end of the spring 31 is secured to the apron 12 by a cotter pin 33. It will be noted from Fig. 5 that the cotter pin 33 is not in alignment with the tab 32. This construction causes the spring 31 to exert a force on the shoe 15 which tends to pull it toward the apron 12 and also pull it circumferentially against the adjustable stop 34. As best shown in Fig. 10 this stop 34 is eccentrically mounted on a stud which extends through the apron 12 and is threaded to take a locking nut 35. This stop 34 extends outwardly from the apron 12 and serves to support the shoe out of contact with the apron 12 and to provide means for adjusting the position of the shoe relative to the brake drum 5.

Diametrically opposite from the stop 34 is a supporting pin or rest 36 which is similar to stop 34 but not eccentrically mounted. As best shown in Fig. 9, the rest 36 is so located in the apron 12 that it contacts with the shoe 15 only at its end on the inwardly extending tab 37.

From the above description it will be seen that the spaced ends 18 and 18' of brake shoe 15 are held in spaced relation to the apron 12 by the U-shaped ends of the levers 20 and 21. The flange 17 and the tab 37 rest on the stops 34 and 36 respectively and the spring 31 tends to hold the shoe in position so that the flange 17 and tab 37 bear on the tops of the stops 34 and 36 and the lining supporting part of the shoe bears radially against the side of the adjustable stop 34. This construction provides a simple and effective floating mounting for the brake shoe 15 on the apron 12.

The retractor springs 26 and 27 are always in tension, serving to hold the ends of the flanges 16 and 17 against the levers 20 and 21 and tending to maintain the shoe 15 in contracted position. The ends of these levers 20 and 21 are shaped to conform to the anchor pin 19 and the ends of the flanges 16 and 17 are shaped to conform to the bottom portion of the U-shaped ends of the levers 20 and 21. This construction is clearly seen in Fig. 6. The spring 26 preferably exerts a greater force than the spring 27 whereby the end 18 of the shoe is more readily moved from the anchor than the end 18'.

Spacing washers 38 are preferably inserted over the ends of the shafts 22 and 23 and between the webs of the levers 20 and 21 when they are being assembled to prevent the flanges of the levers 20 and 21 from being forced together when the ends of the shafts 22 and 23 are riveted over. Similar spacing washers 39 may be inserted between the webs of the external levers 13 and 14 for the same purpose.

Fig. 7 illustrates the position of the ends 18 and 18' of the shoe 15 when braking the rotation of the wheel in a forward direction (as indicated by the arrow). Assume that Fig. 6 represents the normal retracted position of the parts, then Fig. 7 would represent the engaged position with the end 18 of the shoe 15 forced against the brake drum by the lever 20 and the end 18' of the shoe forced onto the anchor pin 19.

In braking rearward rotation of the wheel the position of the parts will be reversed and the end 18 of the shoe 15 will be anchored by pin 19 while the end 18' of the shoe engages the brake drum.

It is to be noted that in the course of the life of the brake adjustment of the turnbuckle 8 will cause the lever 20 to assume a position somewhat similar to that shown in Fig. 7 when the brake is in idle position. Under such conditions the spring 27 keeps the end of the flange 16 snugly in contact with the curved end of the lever 20 whereby the shoe is held against radial movement. The spring 31 exerts a lateral force urging the midportion of the shoe toward the apron and, with the pins 34 and 36 as a fulcrum, urges the ends of the shoe away from the apron. However the ends of the shoe are restrained by the side flanges of the levers 20 and 21 whereby all parts of the shoe are actively and resiliently held against lateral displacement.

The external operating levers 13 and 14 are illustrated in detail in Figs. 12, 13, 14 and 15. These levers are preferably stamped out of sheet metal. The lever 13 is formed with a square bottomed cup portion 40 which is adapted to fit the end of the conduit 7. Holes 41 extend through the flanges 42. A bolt 43 passes through these holes and serves to clamp the end of the conduit 7 firmly in the cup portion 40. Elongated holes 44 for the shaft 22 are formed in the ends of flanges 42. A hole 45 is punched in the bottom of the cup portion 40 to allow the cable 6 to pass through to the actuating lever 14. This lever 14 may be generally similar to lever 13 except that the cup portion 46 has a rounded bottom portion and is provided with a slot 47 for the cable 6. This slot 47 is of less width than the inside diameter of the cup portion 46 so that, although the cable 6 may be slipped into the slot, the ball shaped retaining member 11, which is secured to the end of the cable 6, will be held in the cup portion 46. Lever 14 is formed with flanges 48 which have elongated shaft holes 49 at their ends in a manner similar to lever 13.

From the above description of one form of my brake mechanism it will be seen that I have provided a brake having a minimum number of simple and inexpensive parts. When installed on a vehicle, as illustrated diagrammatically in Fig. 1, any suitable means for exerting tension may be utilized, for example the common foot pedal operated hook-up. With such an arrangement, when the pedal is depressed the cable 6 will be pulled back as indicated by the arrow in Figs. 1 and 3. As one end of conduit 7 is secured to the vehicle frame by the clamp 7' movement of the cable in the direction of the arrow (Fig. 3) will result in movement of either one or both of levers 13 and 14. Under normal conditions when the vehicle is moving forward and the wheel rotating in the direction of the arrow tension on the cable 6 will cause the lever 14 to move upwardly thus forcing the end 18 of the shoe 15 into braking contact with the drum. The reason the lever 14 moves rather than lever 13 under the above conditions is because retractor spring is stronger than the spring 27 and thus the lever 13 has more resistance to movement than lever 14.

As soon as the end 18 of the shoe 15 contacts with the rotating brake drum the self-energizing action begins and the friction between drum and shoe will tend to expand the shoe and increase the braking effect. The end 17 of the shoe 15 is anchored by the pin 19 which takes the braking load.

When the vehicle is moving backwards and the wheel is rotating in the reverse direction tension applied to cable 6 will first cause lever 14 to move and end 18 of the shoe 15 to contact with the drum. When this point is reached the rotation of the wheel and drum will tend to push the end 18 of the shoe towards the anchor pin 19 and no further expanding movement of this end of the shoe will be possible. At this point the pull on the cable 6 will cause the lever 13 to be moved downwardly by the incompressible conduit 7 and the end 18' of the shoe 15 to be moved out into contact with the rotating drum. The rotation of the drum in this case will cause the end 18' of the shoe to move circumferentially away from the anchor pin 19 and end 18 of the shoe to force lever 20 against the pin 19 and be anchored thereby. The pin 19 acts the same in reverse as in forward rotation of the wheels except that in reverse the braking load is exerted in an upward direction from the end 18 of the shoe while in forward rotation it is exerted in a downward direction by the end 17 of the shoe.

Regardless of the direction of rotation of the wheel and brake drum the end of the brake shoe having the least resistance to movement will be moved when a pull is exerted on the cable 6. If the end 18 of the shoe has the least resistance the lever 14 will move and the end of the cable 6 will be pulled upwardly relative to its position in Fig. 3. If on the other hand, the end 18' of the shoe has the least resistance to movement, the lever 13 will be moved by the conduit 7, the end of the cable 6 in this case remaining stationary.

In Fig. 17, I have illustrated a modified form of spreading mechanism wherein levers 50 and 51, otherwise similar to levers 20 and 21, have their shoe engaging ends spaced from the anchor and carry pins 52 and 53 which extend through radial slots 54 and 55 formed in the shoe ends.

From the foregoing numerous aspects and advantages of my invention have become apparent. In Figs. 1, 2 and 3 it is to be noted that the control including the cable 9 and conduit 7 lies parallel to the swivelling axis at its lower end whereby relatively little flexure of the control results when the wheels are turned. The preferred form of this phase of my invention is shown in Fig. 3 wherein the end of the control is not only parallel to the swivelling axis but is relatively close to it. This arrangement further reduces flexing the control when the wheels are turned. It should also be noted that the disposition of the spreading mechanism in front of the steering knuckle as contrasted to above it gives greater room for the moving parts, permits more leeway in forming the apron and otherwise facilitates manufacture and assembly of the brake.

While only a preferred and certain modified forms of my invention are shown and described herein I do not care to be limited thereto or in any manner other than by the claims appended hereto.

I claim:—

1. In a brake the combination of a drum, an expansible shoe having spaced ends disposed within said drum, a pair of pivoted levers adapted to engage said spaced ends, a flexible incompressible member, a flexible tension member, means for connecting said flexible incompressible member to actuate one of said levers and said flexible tension member to actuate the other of said levers whereby relative movement of said incompressible member and said tension member will cause movement of one of said levers and means for causing one end of said shoe to resist movement more than the other end of said shoe.

2. In a vehicle having a frame carrying brake operating mechanism, an axle, a wheel swivelled on said axle and carrying a brake drum, a brake disposed within said drum and mounted on a fixed part swivelling with said wheel, a pair of brake actuating levers pivotally mounted on said fixed part and having relatively movable ends without the body of the brake, and a flexible control extending between the frame and said levers and extending horizontally fore and aft at one end adjacent the frame and curving and extending parallel to the swivelling axis of the wheel at the other end adjacent said levers, said control comprising a flexible conduit housing a cable, the cable connected between one of said levers and said operating mechanism, the conduit being secured to the frame at one end and to the other of said levers at the other.

3. In a brake the combination of a brake shoe having spaced ends, an apron, a pair of oppositely disposed rests on said apron, means to engage the ends of said shoe, inwardly extending projections on said shoe laterally supported on said rests and holding said shoe out of contact with said apron and resilient means disposed substantially opposite said spaced shoe ends and connecting said shoe and apron to maintain said projections in contact with said stops.

4. In a brake, an apron, an anchor carried thereby, a pair of oppositely disposed rests carried by the apron and each spaced about ninety degrees therefrom, a pair of operating levers near and on opposite sides of the anchor and each pivotally mounted in the apron, a full floating substantially annular shoe having an arcuate lining supporting part and inwardly extending radial parts, said rests engaging said radial parts and spacing the shoe from the apron, resilient means disposed opposite the anchor and drawing the mid-portion of the shoe toward the apron, said levers laterally engaging the ends of the shoe near the anchor and restraining their movement away from the apron whereby the mid-portion of the shoe is held away from the apron.

5. A brake according to claim 4 wherein one of said rests also engages the said lining supporting part of the shoe to limit its inward radial movement and wherein said resilient means also acts to draw the shoe into contact with said rest.

6. A brake having a cylindrical anchor pin, a shoe having an end part disposed adjacent said anchor pin and formed with a concave curved extremity struck from the center of said anchor pin, and an actuating lever having a part curved to conform with said pin and said extremity of the shoe and disposed between the anchor and the shoe and arranged to transmit thrust from said shoe to said anchor, and acting to position said shoe radially.

7. A brake comprising a rotatable drum, a fixed apron, a circular shoe within said drum having separable ends, an anchor pin secured to said apron, a pair of rotatable shafts extending through and supported by said apron, a pair of shoe spreading levers secured to said shafts and having one end thereof normally lying, when said shoe is at rest, against the anchor and abutting at one side against one end of the shoe, the other of said levers abutting against the anchor in opposition to said first named lever and engaging at one side the opposite end of the shoe, and means for rotating said shafts whereby one end of the shoe will be moved into braking contact with said drum, and resilient members engaging the lower end of each of said levers adapted to oppose the rotative effort of said shafts.

8. In a brake having a drum, a friction device therein, an apron, a rotatable shaft extending through the apron, an operating lever of channel cross section mounted on the shaft, and a washer on the shaft straddled by the arms of said lever.

9. A brake having a drum, a friction device with a movable end, an anchor for the movable end, an apron, a lever pivotally mounted in the apron between the movable end and anchor and engaging said end for moving said device into engagement with said drum, said lever also laterally engaging and supporting said end and holding the device in certain relation to said apron, and resilient means urging at least the end of said device away from the apron and into lateral contact with said lever.

10. In a brake, a friction device having adjacent separable ends, an apron, an anchor carried by said apron between said ends for taking torque from either of them, a pair of levers pivotally mounted adjacent said anchor and each having parts interposed between said ends and said anchor but free from positive connection with said ends and said anchor, and means for swinging said levers relative to each other whereby one or the other of said ends is moved from said anchor while braking torque is delivered through the other to the apron, said means comprising a pair of shafts journaled in the apron, a cable for rotating one of said shafts and a conduit for rotating the other of said shafts.

11. A brake comprising a rotatable drum, a fixed apron, a circular brake shoe having separable ends within said apron and lying between the ends of the shoe and means for spreading said ends including a pair of rotatable shafts supported by said apron, a pair of shoe spreading levers mounted for rotation with said shafts, each of said levers lying between the ends of said shoe and the anchor at one end and free from positive connection with said end and anchor, and means for imposing rotative effort on both of said shafts comprising a cable operatively associated with one of said shafts and a conduit operatively associated with the other of said shafts.

12. In a brake, the combination of a drum, an expansible shoe having separable ends disposed within said drum, an anchor pin located between the ends of said shoe, means for separating said shoe ends comprising a pair of levers, a pair of shafts mounted in said apron, said levers being mounted for rotation with said shafts and being connected thereto at the lower ends of said levers lying between the ends of the shoe and anchor and being free from positive connection with said ends and anchor, a second pair of levers connected to said shafts and lying on the outside of said apron, and means for rotating said levers, said means comprising a flexible incompressible member and a flexible tension member.

JOHN SNEED.